Nov. 24, 1970  J. S. WARHURST ET AL  3,542,934

SUBMARINE SIMULATOR

Filed March 6, 1968  3 Sheets-Sheet 1

Joseph S. Warhurst
James A. Carnell
Richard V. Frizell
Peter Schrimmer
Robert D. Saunders
Robert L. Wyener
INVENTORS BY John M. Pease Attorney

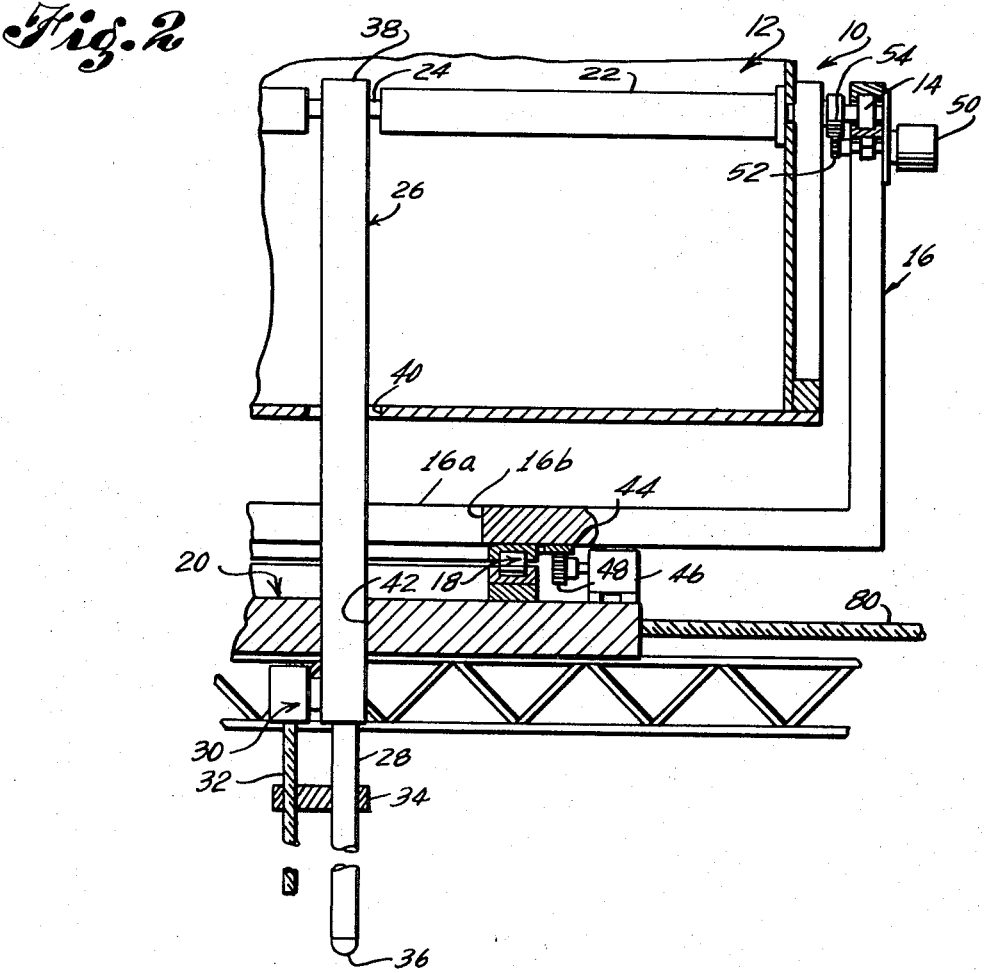
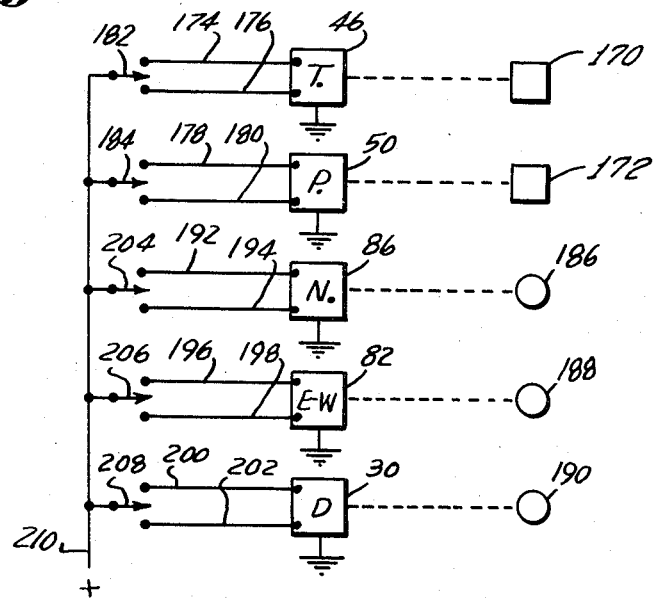

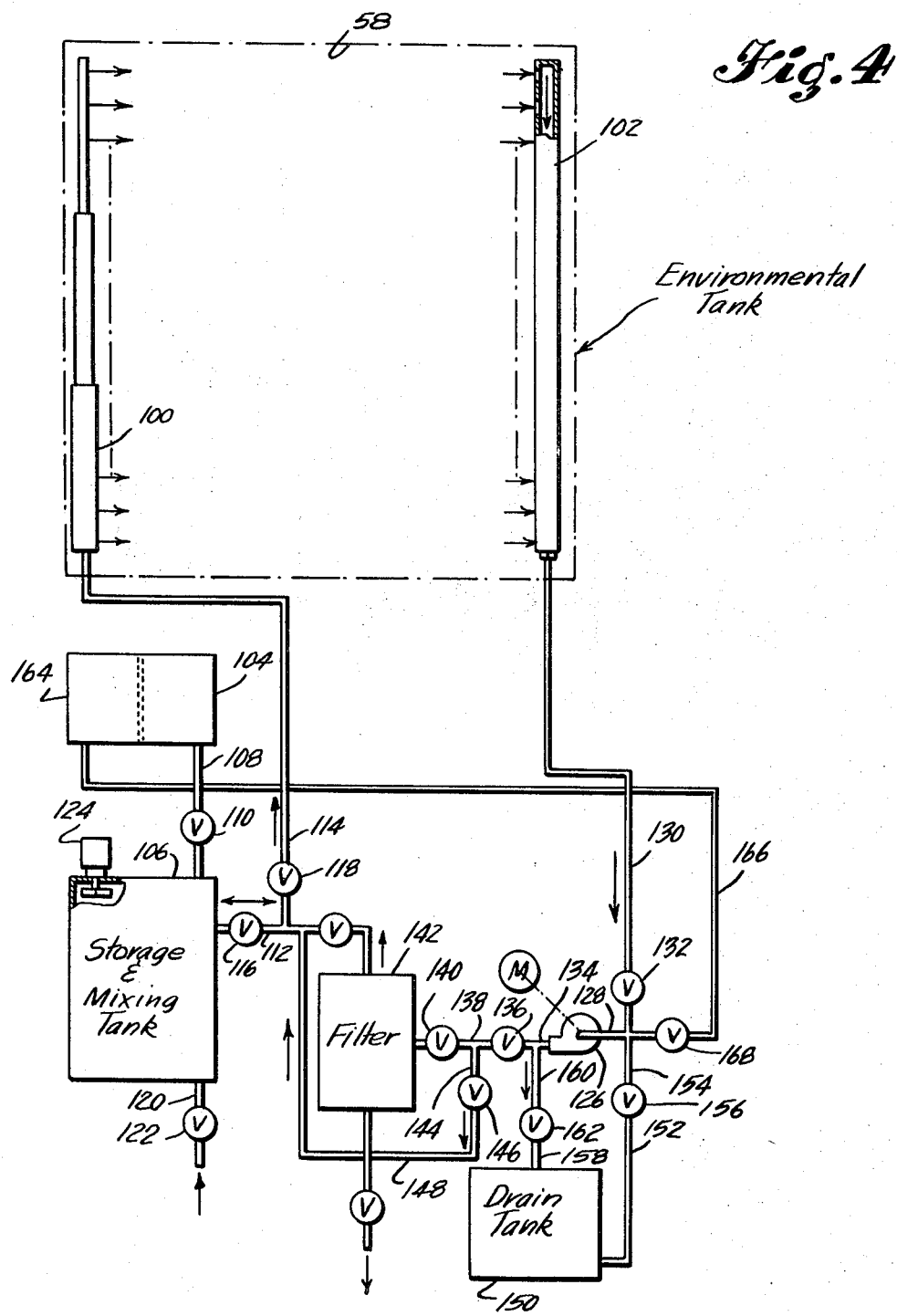

3,542,934
SUBMARINE SIMULATOR
Robert L. Wyener, Casselberry, Fla., and Joseph S. Warhurst, Clinton, James A. Carnell, Old Lyme, Richard V. Frizell, Norwich, Peter Schrimmer, Old Saybrook, and Robert D. Saunders, Bridgeport, Conn., assignors, by direct and mesne assignments, to the United States of America as represented by the Secretary of the Navy
Filed Mar. 6, 1968, Ser. No. 710,969
Int. Cl. G01c 7/04, 21/00; G09b 9/06
U.S. Cl. 35—10.2
7 Claims

ABSTRACT OF THE DISCLOSURE

This invention relates to a submarine simulator for unprogrammed training in underwater navigation and reconnaissance in which a telescopic optical system is pivotally mounted in depending position from a cab in turn mounted in gimbals from a movable support and guide means positioned over an environmental water tank having a model terrain positioned on the bottom thereof and a coloration and filter system to provide turbidity control of the water in the tank. Drive means are provided for rotating and tilting the cab to provide turn and pitch simulation, for extending and retracting the telescopic optical system to simulate vertical raise and descent and for transverse motion of the cab to maneuver the optical system above and along the model terrain. Instrumentation and computer means are provided to orient and indicate the position of the optical system in relation to the model terrain.

BACKGROUND OF THE INVENTION

Figure 1:
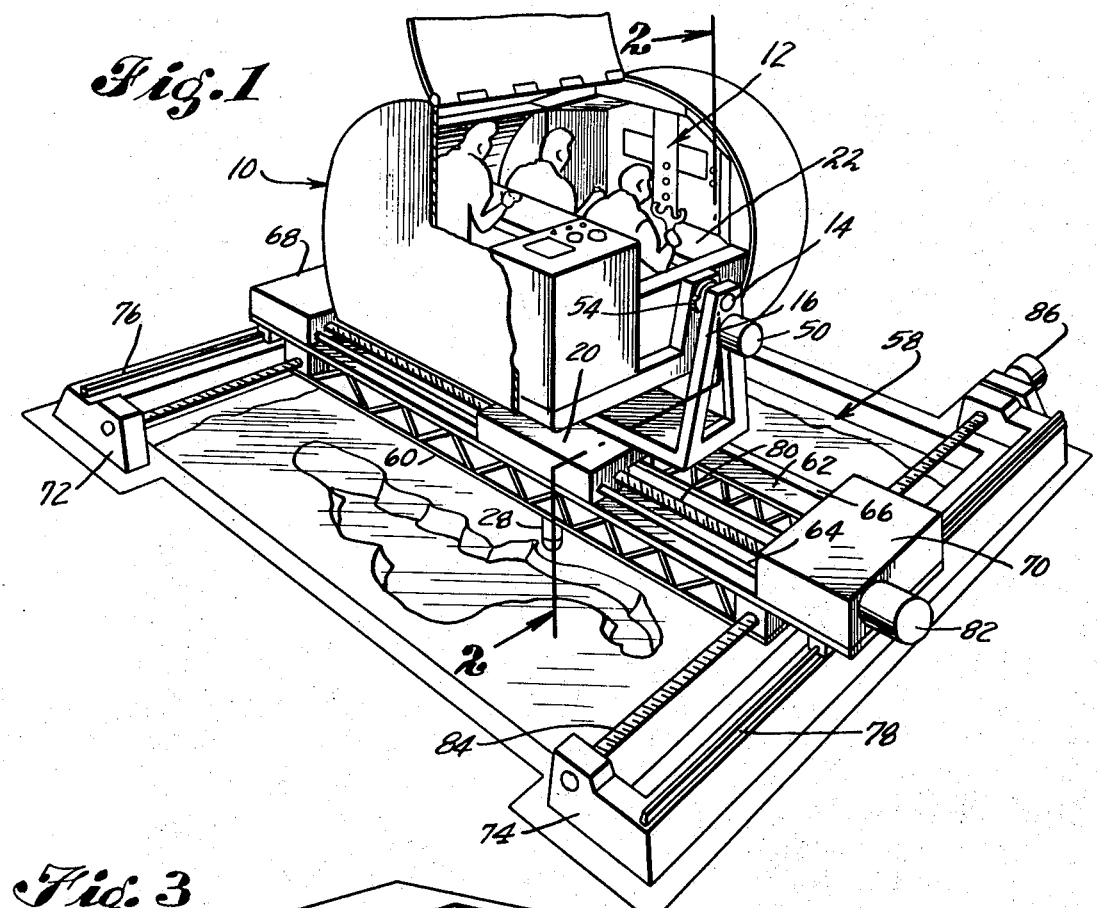

The invention relates to the field of instruction and more particularly to instruction by way of devices capable of simulation of underwater vehicles and environment.

As the result of growing interest in the exploration and tactical use of the ocean bottom, as well as location and retrieval of sunken vessels, it has become imperative that means be provided to teach navigation and reconnaissance of great ocean depths with the aid of small submersible vehicles while avoiding the risk and cost of actual operation of such vessels.

In the past, simulators have been built to train operators in the control and operation of submersible vehicles and in programmed training in underwater navigation and reconnaissance. Such trainers, however, do not realistically produce actual operating conditions and environment. The present invention provides a training device capable of unprogrammed reconnaissance under environmental conditions closely approximating actual underwater environment, including current and turbidity control of water in an environmental water tank. To the best of applicants' knowledge, the prior art does not include a device of comparable capability.

SUMMARY OF THE INVENTION

The invention in brief comprises an environmental tank having turbidity control means together with a cab capable of simulation of operation of a submersible vehicle and an optical system with means controlling its horizontal, vertical and turn movements in relation to a model terrain in the bottom of the tank to produce the effect of an actual unprogrammed reconnaissance under water controllable in turbidity to reproduce actual conditions which would be encountered in an actual undersea voyage.

IN THE DRAWINGS

Figure 3:
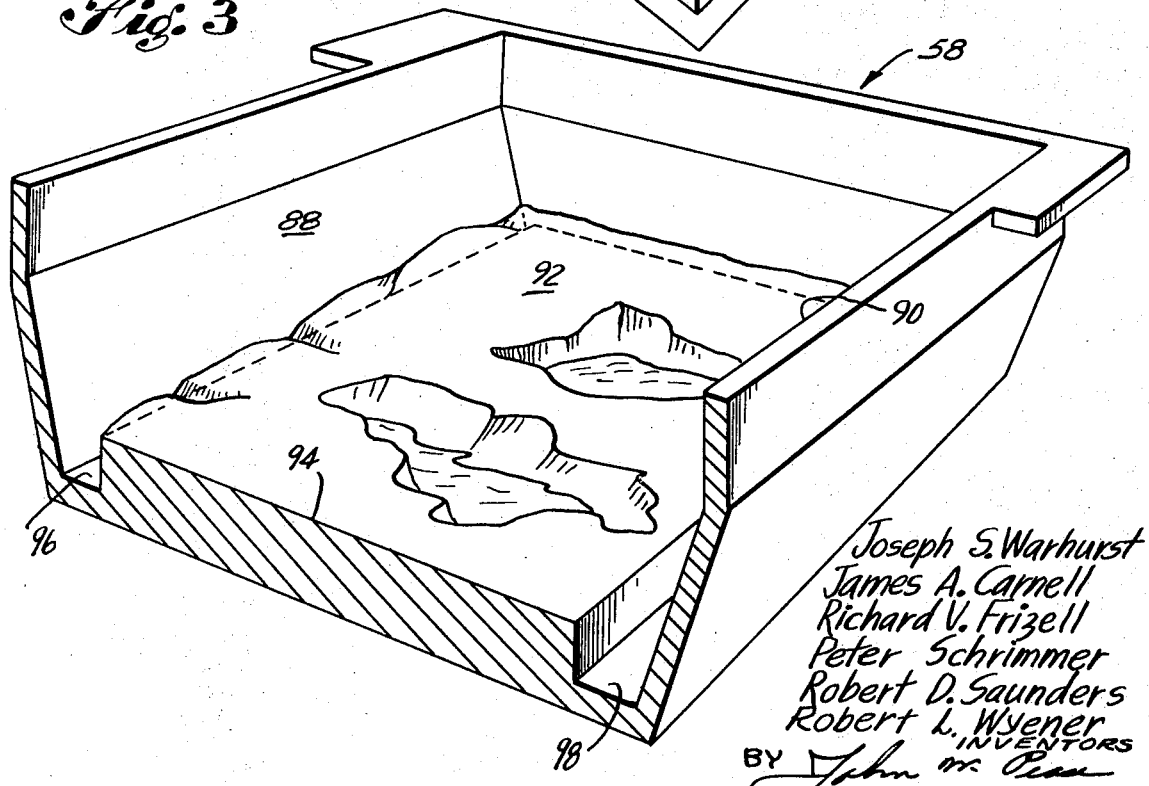

FIG. 1 is a perspective view of a submarine simulator incorporating the invention, FIG. 2 is an enlarged view partially in cross-section taken on line 2—2 of FIG. 1 and provided to show drive and bearing supports for applying motion to various portions of the simulator, FIG. 3 is a perspective view of the environmental tank portion of the simulator including the model terrain positioned in the bottom thereof, FIG. 4 is a diagrammatical sketch showing a turbidity control system for the water of the environmental tank, and FIG. 5 is a simplified electrical circuit provided to explain the control and operation of the simulator of FIG. 1.

DESCRIPTION OF THE PREFERRED EMBODIMENT

Referring to the drawings and initially to FIGS. 1 and 2, there is shown a simulator 10 incorporating the invention. The simulator 10 as seen in FIG. 1 incorporates a control cab 12 pivotally mounted as at bearing 14 on a gimbal frame 16 to provide pitch simulation. The frame 16, as shown in FIG. 2, is formed with a horizontally extending portion 16a apertured as at 16b and rotatably supported by a circular bearing 18 on a support platform 20, such that the entire cab can be pivoted about 30 degrees on the gimbal frame 16 and rotated 360 degrees on the bearing 18.

Suspended from a cross frame member of the cab such as the panel 22 and from a pivot support 24 is a telescopic optical system having telescopic cylinders 26 and 28. The cylinder 28 is slidably moved vertically in relation to the fixed cylinder 26 by suitable drive means, as for example a servo motor 30 fixed to the cylinder 26 and a drive screw 32 threaded into a bracket 34 fixed to the movable cylinder 28. The lower end of the cylinder 28 is provided with a viewing lens indicated at 36 and the upper end of cylinder 26 is provided with an eye piece 38. Pivot support 24 and bearing 14 are positioned on a common axis and the eye piece 38 is positioned substantially on the same axis such that the eye piece has minimum relative movement with respect to the cab 12 when the cab is tilted in pitch. A slot 40 is formed in the deck of the cab to avoid interference when the cab is tilted. The cylinder 26 is passed through a close fitting aperture 42 in platform 20 to maintain the optical system in vertical position at all times.

Suitable means are provided to rotate the cab 12 through 360 degrees on the bearing 18, thereby carrying the optical system also through 360 degrees. As shown in FIG. 2, a ring gear 44 fixed to the lower side of the frame portion 16a and a servo motor 46 fixed to platform 20 and having a drive gear 48 are provided. The cab 12 is tilted in pitch by a servo motor 50 driving a drive gear 52 engaged with a sector gear 54, the motor 50 being fixed to the gimbal 16 and the sector gear being fixed to the cab 12.

To provide for motion of the cab 12 and its optical system on an $x$ and $y$ axis above the environmental tank indicated generally at 58 in FIG. 1, a movable support comprising ways and guide means is provided. Thus, platform 20 is slidably supported on truss members 60 and 62 and guided by rails 64 and 66. Opposite adjacent ends of the truss members 60 and 62 are joined by end supports 68 and 70 which are slidably positioned on ways 72 and 74 and guided by rails 76 and 78. The platform 20 carrying the cab 12 is moved laterally by a screw 80 passing through a threaded portion of the platform, the screw 80 being driven by a servo motor 82. The cab 12 and supporting truss is moved forward and aft on the ways 72 and 74 by a screw 84 driven by a servo motor 86.

The environmental tank 58 as shown in FIG. 3 is formed with oppositely disposed side walls 88 and 90 and the model terrain 92 is positioned on a raised portion 94 of the tank bottom in spaced relation to the side walls 88 and 90 to form channels 96 and 98 on opposite sides of the terrain 92.

Referring to FIG. 4, there is shown one suitable turbidity control system comprising a discharge header 100 through which water is supplied to the tank and suction header 102 through which water is withdrawn from the tank. The water introduced to the tank passes from the discharge header to the suction header across the model terrain and produces a simulated current.

To control the color density of the water in the tank, a suitable color additive is passed from a chemical storage tank 104 to a storage and mixing tank 106 via conduit 108 and control valve 110, and thence through lines 112 and 114 and valves 116 and 118 to discharge header 100. Water is added to the mixing tank 106 through make-up line 120 and valve 122. A suitable agitator 124 is provided to mix the water and chemical.

Water is removed from the tank 58 by a suction pump 126 via conduits 128 and 130 and valve 132, and passed through conduit 134, valve 136, conduit 138 and valve 140 to a filter 142 for the purpose of removing color from the water; or alternatively, if color removal is not desired, the water from pump 126 is passed through conduit 134, valve 136, conduit 138, conduit 144, valve 146, conduit 148 and back to the intake valve 118 for the discharge header 100.

A drain tank 150 is connected through lines 152 and 154 and valve 156 to the suction side of the pump 126 and through lines 158 and 160 and valve 162 to the discharge side conduit 134 of pump 126 to remove water from the tank 58. A second chemical storage tank 164 is connected through conduit 166 and a valve 168 to the intake side of pump 126 to pass a second solution of chemicals to the fluid being circulated through the tank 58. The reaction of a first solution of chemicals obtained from storage tank 104 and a second solution of chemicals obtained from the tank 164 produce the required turbidity in the environment tank 58. Increase in turbidity is obtained by adding solution #2 and reduction in turbidity is obtained by filtering through the filter 142.

Various suspensions of magnesium, aluminum, iron, calcium, sodium, copper, hydroxides, oxalates, chlorides and silicates have been employed to produce turbidity. A mixture of magnesium hydroxide and calcium oxalate has produced excellent results. However, the most dependable and readily controllable results are obtained by adding relatively small amounts of a solution of oxalic acid, partially neutralized by sodium hydroxide (solution #2) to a soltuion of calcium chloride, thereby producing a white precipitate of calcium oxalate and adding dilute coffee for color (solution #1). An example of specific procedure in the formation of satisfactory solutions #1 and #2 is as follows: To 17.4 gallons of water in a glass tank, 70.00 grams of dry calcium chloride was added and stirred until completely dissolved. 50 milliliters of potable coffee was added for color. A second solution was made as follows: 86 grams of dry oxalic acid crystals was added to 1000 milliliters of water. Several drops of phenolphthalein indicator was added, followed by sodium hydroxide pellets and water and until the indicator just showed a base reaction. Water was added to make 1500 milliliters. Just enough hydrochloric acid was added to turn the solution colorless again. The solution was then allowed to stand four hours and 50 milliliters of the clear upper solution was withdrawn and used as stock solution #2. To the tank solution of calcium chloride, 1.0 or 2.0 milliliters portions of solution #2 were added with constant agitation until a noticeable change in visibility took place.

When turbidity is developed in the tank 58 by the turbidity system shown in FIG. 4, any degree of turbidity can be obtained by either adding solution #2 or filtering through the filter 142.

To be considered feasible in a simulator, any means of producing the effect of turbidity must be optically effective and easily controlled. Optical effectiveness requires that the image constrast decrease realistically as a function of scaled distance. Contrast cannot be reduced by introducing filters or other means at one place in the optical system. Such means will reduce the contrast of all images, regardless of distance, and realistic environmental effect is lost.

Any suitable means may be used for operational control of the drive motors, and for signal generation and instrumentation to indicate the rotatable position of each motor and hence the positions of turn, pitch, depth and traverse movement. In commercial application, conventional analog computers with summation circuits may be employed and inputs will include such factors as throttle, thrust angle, drift, auxiliary thrust, attitude angle, and instructor over-ride signals. It is not necessary for an understanding of this invention to show and describe such sophisticated circuitry and a simplified diagrammatic circuit as shown in FIG. 5 should suffice.

As shown in FIG. 5, the turn motor 46 and pitch motor 50 are connected respectively to the heading and pitch servo motor indicators 170 and 172 to indicate the degree turn and pitch. Motors 46 and 50 are energized for drive in either direction from respective lines 174 and 176 and 178 and 180 by manually operated switches 182 and 184. The motors 86, 82, and 30 which drive screws in the orientation of the cab 12 and in the extension and retraction of the telescopic optical system are connected respectively to drive the revolution counter indicators 186, 188, and 190. The indicators 186 and 188 may be scaled to read in latitude and longitude to indicate the oriented position of the optical system view lens 36 with respect to the model terrain. The indicator 190 may be scaled to read depth in feet. Motor 86 is energized from lines 192 and 194 through manual switch 204. Motor 82 is energized from lines 196 and 198 through manual switch 206, and motor 30 is energized from lines 200 and 202 through manual switch 208. Switches 182, 184, 204, 206, and 208 are energized from a suitable electrical source indicated by the line 210, the motors being grounded as indicated for return.

OPERATION

In operation, the simulator is capable of unprogrammed training in underwater navigation and reconnaissance under conditions of current and turbidity closely approximating actual conditions. Current is controlled by controlling the rate of pumping. Turbidity is controlled by adding chemicals to increase turbidity and filtering to remove chemicals and decrease turbidity. Traverse movements simulating variation in latitude and longitude are controlled by the motors 86 and 82. Simulation of depth is controlled by the motor 30, and heading and pitch are controlled by the respective motors 46 and 50.

The direct view optical system can be augmented by a television system wherein a television camera (not shown) is mounted and position controlled in the same manner as described for the direct view optical system and wherein a television receiver (not shown) is remotely located in the cab 12 or elsewhere as desired.

It will be understood that various other changes in the details, materials, and arrangements of parts, which have been described and illustrated in order to explain the nature of the invention, may be made by those skilled in the art within the principle and scope of the invention as expressed in the appended claims.

What is claimed is:

1. A submarine simulator for unprogrammed training in underwater navigation and reconnaissance comprising:

(a) a tank having side walls and bottom for partially filling with water to form an environmental tank;
(b) a model terrain positioned on said tank bottom;
(c) an optical system including telescopic mounting and a view piece;
(d) said telescopic mounting having a longitudinal axis;
(e) movable support and guide means for dependingly supporting and guiding said telescopic mounting of said optical system in said water above and along said terrain model and for rotating said mounting about said longitudinal axis to simulate lateral and turning movement of a submerged vehicle;
(f) said telescopic mounting being adjustable in length to simulate vertical movement of said submerged vehicle;
(g) manually controlled drive means for adjustably effecting movements of said telescopic mounting;
(h) signal generator and instrument means for indicating movements of said optical system and the position of said view piece in relation to said terrain model;
(i) a cab dimensioned to house said signal generator and instrument means;
(j) gimbal means for tiltably mounting said cab on said movable support to simulate pitch of a submerged vehicle; and
(k) manually controlled drive means for effecting tilt of said cab with respect to said movable support.

2. A simulator according to claim 1, and
(a) said optical system having an eye piece portion positioned in said cab;
(b) means tiltably mounting said telescopic mounting to said cab on an axis normal to the longitudinal axis of telescopic mounting and common with the tilt axis of said cab, said common axis passing through said optical system eye piece; and
(c) means for coordinating the tilt of said cab with a corresponding tilt of said telescopic mounting to maintain the longitudinal axis of said telescopic mounting in vertical position above said terrain model.

3. A submarine simulator for unprogrammed training in underwater navigation and reconnaissance comprising:
(a) a tank having side walls and bottom for partially filling with water to form an environmental tank;
(b) a model terrain positioned on said tank bottom;
(c) an optical system including telescopic mounting having a telescopic portion and a view piece;
(d) said telescopic mounting having a longitudinal axis;
(e) movable support and guide means for dependingly supporting and guiding said telescopic portion of said optical system in said water above and along said terrain model and for rotating said mounting about said longitudinal axis to simulate lateral and turning movement of a submerged vehicle;
(f) said telescopic portion being adjustable in length to simulate vertical movement of said submerged vehicle;
(g) manually controlled drive means for adjustably effecting the length of said telescopic portion;
(h) signal generator and instrument means for indicating the longitudinal adjustments of said telescopic portion of said optical system and the position of said view piece in relation to said terrain model; and
(i) turbidity control system including a pumping system and mixer means for introducing a chemical additive for selective degree of coloration of said water to simulate a selected desired degree of turbidity and for circulating water through said environmental tank, and a filtration means for removing coloration from said water to simulate a selected lesser degree of turbidity.

4. A simulator according to claim 3, and further including
(a) said model terrain being positioned on said tank bottom in spaced relation to said tank side walls to form channels on opposite sides of said model terrain and to prevent picking up the image of said tank side walls by said optical system.

5. A simulator according to claim 4, and
(a) said pumping system and mixer means including a storage and mixing tank with agitator means, a chemical storage tank connected to supply chemical additive to water in said tank, a discharge header positioned in one channel of said environment tank and connected to receive fluid from said mixing tank, a suction header positioned on the opposite side channel in said environment tank to collect water from said environment tank, a drain tank connected to remove water from said environment tank, and a suction pump means connected to circulate water from said suction header to said discharge header;
(b) said filtration means including a high capacity filter and bypass line connected in parallel between said headers and in series with said suction pump means; and
(c) valve means for selectively adjusting the relative flow of water through said filter and bypass line.

6. A simulator according to claim 5, including
(a) a cab dimensioned to house said signal generator and instrument means;
(b) gimbal means for tiltably mounting said cab on said movable support to simulate pitch of a submerged vehicle; and
(c) manually controlled drive means for effecting tilt of said cab with respect to said movable support.

7. A simulator according to claim 6, including
(a) said optical system having an eye piece portion positioned in said cab;
(b) means tiltably mounting said telescopic mounting to said cab on an axis normal to the longitudinal axis of telescopic mounting and common with the tilt axis of said cab, said common axis passing through said optical system eye piece; and
(c) means for coordinating the tilt of said cab with a corresponding tilt of said telescopic mounting to maintain the longitudinal axis of said telescopic mounting in vertical position above said terrain model.

References Cited

UNITED STATES PATENTS

| | | | |
|---|---|---|---|
| 1,048,152 | 12/1912 | Gregson | 272—16 |
| 2,492,969 | 1/1950 | Crane | 272—17 |
| 2,751,880 | 6/1956 | Markowski | 272—16 X |
| 2,885,701 | 10/1958 | Roos | 35—10.2 |
| 3,039,204 | 6/1962 | Bryan et al. | 35—10.2 |

FOREIGN PATENTS 1,000,991  8/1965  Great Britain.

MALCOLM A. MORRISON, Primary Examiner

F. D. GRUBER, Assistant Examiner

U.S. Cl. X.R.

35—11; 272—18